UNITED STATES PATENT OFFICE.

EUGEN ANDERWERT AND HEINRICH SCHOBEL, OF BASEL, SWITZERLAND, ASSIGNORS TO SOCIETY OF CHEMICAL INDUSTRY IN BASLE, OF BASEL, SWITZERLAND.

WOOL DISAZO DYESTUFFS AND A PROCESS OF MAKING SAME.

1,233,742.   Specification of Letters Patent.   Patented July 17, 1917.

No Drawing.   Application filed April 9, 1917.   Serial No. 160,855.

*To all whom it may concern:*

Be it known that we, EUGEN ANDERWERT and HEINRICH SCHOBEL, both citizens of the Swiss Republic, and residents of Basel, Switzerland, have invented new and useful Wool Disazo Dyestuffs and a Process of Making Same, of which the following is a full, clear, and exact specification.

We have found that by combining the tetrazo derivative of a 3-3'-diaminodiarylmethan compound with two molecules of azo dyestuff components whereof at least one is a molecule of a naphtholsulfonic acid new disazo dyestuffs are obtained which dye wool very pure tints fast to light and to fulling. As 3-3'-diaminodiarylmethan compound may be employed advantageously the 3-3'-diamino-4-4'-dimethyldiphenylmethan, the 3-3'-diaminodiphenylmethan and their derivatives.

The invention is illustrated by the following examples:

Example 1: 22.6 kg. of 3-3'-diamino-4-4'-dimethyldiphenylmethan are dissolved in 60 kg. hydrochloric acid and tetrazotized at about 0° C. with a solution of 14.2 kg. sodium nitrite. The resulting solution of tetrazo compound is poured, while stirring, into a solution of 52 kg. 1-4-naphtholsulfonic acid and of 50 kg. sodium carbonate. After standing for a long time, the mass is heated at 60° C., and the dyestuff salted out with common salt, filtered off, pressed and dried. It constitutes a red powder, which dissolves in water and in concentrated sulfuric acid with a red coloration and dyes wool in an acid bath very pure red tints possessing a very good fastness to washing and to light.

Example 2: By substituting in the Example 1 for the 1-4-naphtholsulfonic acid the same quantity of 2-6-naphtholsulfonic acid, the resulting dyestuff dissolves in water and concentrated sulfuric acid to a yellow-red solution and dyes wool in an acid bath very pure yellow-red tints of a good fastness to washing and to light.

Example 3: The tetrazo compound prepared according to Example 1 is poured, while stirring, into a solution of 34.8 kg. 2-naphthol-3-6-disulfonic acid and of 50 kg. of sodium acetate, at about 0° C. After stirring for about 2 hours the intermediate product is achieved and poured into a solution of 15 kg. of betanaphthol, 13 kg. of soda lye of 30 per cent. and 50 kg. of sodium carbonate. After stirring for a long time the combination is achieved and the dyestuff isolated according to the usual manner. It dissolves in water and concentrated sulfuric acid to red solutions and dyes wool in an acid bath pure scarlet-red tints of a good fastness to fulling and to light.

Example 4: The solution of tetrazo compound derived from 22.6 kg. of 3-3'-diamino-4-4'-dimethyldiphenylmethan according to Example 1 is mixed with the solution of 27.6 kg. of 1-(4'-sulfo-)-phenyl-3-methyl-5-pyrazolone and of 50 kg. of crystallized sodium acetate. After formation of the intermediate product, that is to say after about 2 hours, the mass is poured into a solution of 26 kg. of 1-4-naphtholsulfonic acid and 50 kg. of sodium carbonate. The combination being effected, the dyestuff is isolated in the usual manner. It dissolves in water and concentrated sulfuric acid to orange solutions and dyes wool in an acid bath red-orange tints fast to washing and to light.

Instead of the 1-(4'-sulfo-)phenyl-3-methyl-5-pyrazolone can be employed with a similar success the 1-phenyl-3-methyl-5-pyrozolone itself or its nitro- or carboxyl derivatives, the acetoacetanilid, the methylketol, etc.

Example 5: 19.8 kg. of 3-3'-diamino-diphenylmethan are tetrazotized with 60 kg. of concentrated hydrochloric acid and 14.2 kg. of sodium nitrite. The resulting tetrazo compound is poured while stirring into a solution of 52 kg. of 1-4-naphtholsulfonic acid and of 50 kg. of sodium carbonate. After some hours, the dyestuff is separated by heating to 30° C., salted out, filtered off, pressed and dried. It constitutes a red powder dissolving in water and concentrated sulfuric acid to red solutions. It dyes wool in an acid bath pure scarlet-red tints of a good fastness to fulling and to light.

Example 6: By substituting for the 1-4-naphtholsulfonic acid employed in Example 5 the same quantity of 2-6-naphtholsulfonic acid, the resulting dyestuff dyes wool in an acid bath pure yellow-red tints of good fastness.

Example 7: The tetrazo solution derived from 19.8 kg. 3-3'-diaminodiphenylmethan is poured, at 0° C., into a solution of 34.8 kg. of 1-naphthol-4-8-disulfonic acid and of 50 kg. of sodium acetate. The intermediate product formed after several hours is poured into a solution of 15 kg. of betanaphthol, 13 kg. of soda lye of 30 per cent. and 50 kg. of sodium carbonate. After 24 hours the dyestuff is isolated in the usual manner. It dissolves in water and concentrated sulfuric acid to red solutions and dyes wool in an acid bath yellow-red tints.

Example 8: The tetrazo solution derived from 19.8 kg. of 3-3'-diaminodiphenylmethan according to Example 5 is added to a solution of 27.6 kg. of 1-(4'-sulfo-)phenyl-3-methyl-5-pyrazolone and 50 kg. of crystallized sodium acetate, in order to form an intermediate product. After about 1 hour this latter is poured into a solution of 26 kg. of 1-4-naphtholsulfonic acid and 50 kg. of sodium carbonate. The dyestuff is isolated in the usual manner. It dissolves in water and in concentrated sulfuric acid to orange solutions and dyes wool orange-red tints of good fastness to fulling and to light.

What we claim is:

1. The described process for the manufacture of disazo dyestuffs fast to light and to fulling, consisting in combining one molecule of the tetrazo derivative of a 3-3'-diaminodiarylmethan compound with 2 molecules of azo dyestuff components whereof at least one molecule is a molecule of a naphtholsulfonic acid.

2. The described process for the manufacture of disazo dyestuffs fast to light and to fulling, consisting in combining one molecule of the tetrazo derivative of a 3-3'-diaminodiphenylmethan with 2 molecules of azo dyestuff components whereof at least one molecule is a molecule of a naphtholsulfonic acid.

3. The described process for the manufacture of disazo dyestuffs fast to light and to fulling consisting in combining one molecule of the tetrazo derivative of 3-3'-diamino-4-4'-dimethyldiphenylmethan with 2 molecules of azo dyestuff components whereof at least one molecule is a molecule of a naphtholsulfonic acid.

4. As new products the described disazo dyestuffs fast to light and to fulling, which derive from 1 molecule of a tetrazotized 3-3'-diaminodiarylmethan compound and 2 molecules of azo dyestuff components whereof at least one molecule is a molecule of a naphtholsulfonic acid and constitute red to yellow orange powders dissolving in water and concentrated sulfuric acid with red to orange colorations and dye wool and other animal fibers in an acid bath vivid blue-red to yellow-orange tints fast to fulling and to light.

5. As a new article of manufacture the described disazo dyestuff derived from 1 molecule of tetrazotized 3-3'-diamino-4-4'-dimethyldiphenylmethan and 2 molecules of 1-4-naphtholsulfonic acid, which constitutes a red powder soluble in water and in concentrated sulfuric acid to red solutions and dyes wool and other animal fibers in an acid bath pure red tints fast to washing and to light.

In witness whereof we have hereunto signed our names this 15th day of March 1917, in the presence of two subscribing witnesses.

EUGEN ANDERWERT.
HEINRICH SCHOBEL.

Witnesses:
ANNA ARBERT,
AMAND RITTER.